United States Patent Office 3,352,890
Patented Nov. 14, 1967

3,352,890
METHOD OF SELECTIVELY REDUCING THE 3-OXO RADICAL OF 3-OXO-6-ALPHA-METH-YL-PREGN-4-EN-20-ONE COMPOUNDS
Ralph I. Dorfman, Bjarte Loken, and Marcel Gut, Shrewsbury, Mass., assignors to Worcester Foundation for Experimental Biology, a non-profit foundation of Massachusetts
No Drawing. Filed Feb. 6, 1964, Ser. No. 343,151
17 Claims. (Cl. 260—397.4)

This invention relates to improved 6-alpha-methyl-pregn-4-en compounds having the formula

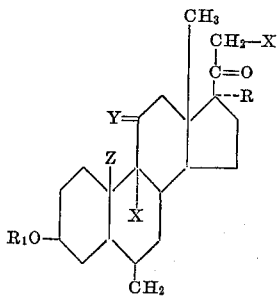

wherein R is hydroxy or acyloxy; $R_1$ is hydrogen or acyl, the acyl group of R or $R_1$ being a carboxylic acid acyl group having from 1 to 10 carbon atoms; X is hydrogen, chlorine or fluorine; Y is =O, beta hydroxy or $H_2$; and Z is hydrogen or methyl, and to a method of selectively reducing the 3-oxo group of a 3,20-dioxo-pregn-4-en compound to reduce the 3-keto to 3-hydroxy, selective to effect that reduction without further reduction of the 20-oxo group and other sensitive groups that may be present in the steroid molecule such as 11-oxo or 17-acyloxy, and without need for ketal blocking groups at least in the sensitive 20 position.

Our compounds have outstanding inhibitory activity in living bodies. Our modified progesterone compounds of this formula are strongly anti-fertility, anti-estrogenic and anti-androgenic. Our compounds of this formula which have oxo or hydroxy substitution in the 11 position are further anti-implantation.

The reduction of progesterone derivatives, as heretofore practiced in the art, usually required the protection of at least the 20-keto group, such as by forming a 20-ketal thereof, and ultimately hydrolyzing that ketal under the mildest conditions and with great danger of elimination of the allylic alcohol function to form a diene. Gut, J. Org. Chem. 21, 1327–1328 (1956). Moreover, while it has been proposed to reduce progesterone in polar solvent such as isopropanol without protection of the 20-oxo group, (D. Kupfer—Tetrahedron 15, 193 (1961)) a complex mixture of reduction products including substantial 20-oxo reduction was always obtained, necessitating laborious and non-commercial digitonide separation of the 3-beta-hydroxy derivative before chromatography. It has been found, surprisingly, according to the present invention, that 6-alpha-methyl-17-alpha-substituted progesterone, and such 3-oxo derivatives of compounds identified in the generic formula stated above can be selectively reduced without need for oxo, particularly 20-oxo, blocking groups where the parent 6-alpha-methyl-17-alpha-substituted progesterone compound is reduced with an alkali metal borohydride in the presence of a substantially nonpolar solvent such as a lower hydrocarbon ether, typically a lower alkyl and cyclo alkyl ether having from 2 to 7 carbon atoms, together with a small quantity, usually about 1% water based on the quantity of solvent.

In a preferred reaction, the 17-acyloxy derivative of 6-alpha-methyl progesterone is used in carrying out the reduction with sodium borohydride, the reducing agent being added to the 6-alpha-methyl-17-alpha-acyloxy progesterone compound in quantity substantially only sufficient to effect the 3-oxo reduction, preferably in lower hydrocarbon ether usually having from 2 to 7 carbon atoms, both cyclic, such as tetrahydrofurane, dioxane, 1,3-dioxolane, 2,2-dimethyl - 1,3 - dioxolane, 2-methyl-2-ethyl-1,3-dioxolane, furan and acyclic, such as lower alkyl ethers like diethyl ether or methyl-ethyl ether, methylisopropyl ether, dimethyl ether, dimethyl acetal, dietoxy ethylene, glycol dimethyl ether, methyl tertiary butyl ether, diisopropyl ether, dibutyl ether and the like. Such solvents are outstanding in this highly selective reduction because fewer side reaction products result and a substantially pure product may be separated by crystallization and filtration.

In effecting the reaction, an excess of reducing agent is generally avoided to avoid possible contamination with other reduction products in this reaction. The reduction is effected largely by ambient temperature contact of the starting compound with the sodium borohydride in the lower hydrocarbon ether solvent in the presence of a trace of water. For instance, the reducing agent is added to the substituted progesterone compound at ambient temperatures in the presence of the solvent for an indefinite period of several minutes up to 100 hours. Thereafter the inorganic oxidation and hydrolysis products are removed by filtration, the clear filtrate evaporated to dryness and the residue crystallized from an appropriate solvent, to give a relatively pure allylic alcohol reduction product made available in commercial quantities in a much simplified procedure.

Various useful derivatives of the 3-hydroxy compound can be formed by common chemical procedures. For instance, the 17-alpha-acyloxy group can be hydrolyzed with methanolic alkali to form a 17-hydroxy compound thereof and/or the 3-hydroxy group can be acylated with a carboxylic acid acyl having from 1 to 10 carbon atoms either by treating the 3-hydroxy reduction product with the anhydride of the desired carboxylic acid or it may be esterified using the appropriate carboxylic acid anhydride in pyridine solution of the allylic alcohol compound.

The carboxylic acid anhydride may be acetic, acrylic, propionic, butyric, dimethyl valeric, caproic, heptanoic, octanoic, cyclopentanoic, cyclohexanoic, phenyl acetic, and the like.

Where the compound desirably carries other substituents as identified in the generic formula above, the starting material usually will have such substitutents; for instance, 11-oxo or hydroxy, 9 or 21 chloro or fluoro as pre-selected before applying the selective reduction hereof.

The reaction is indicated diagrammatically according to the following scheme:

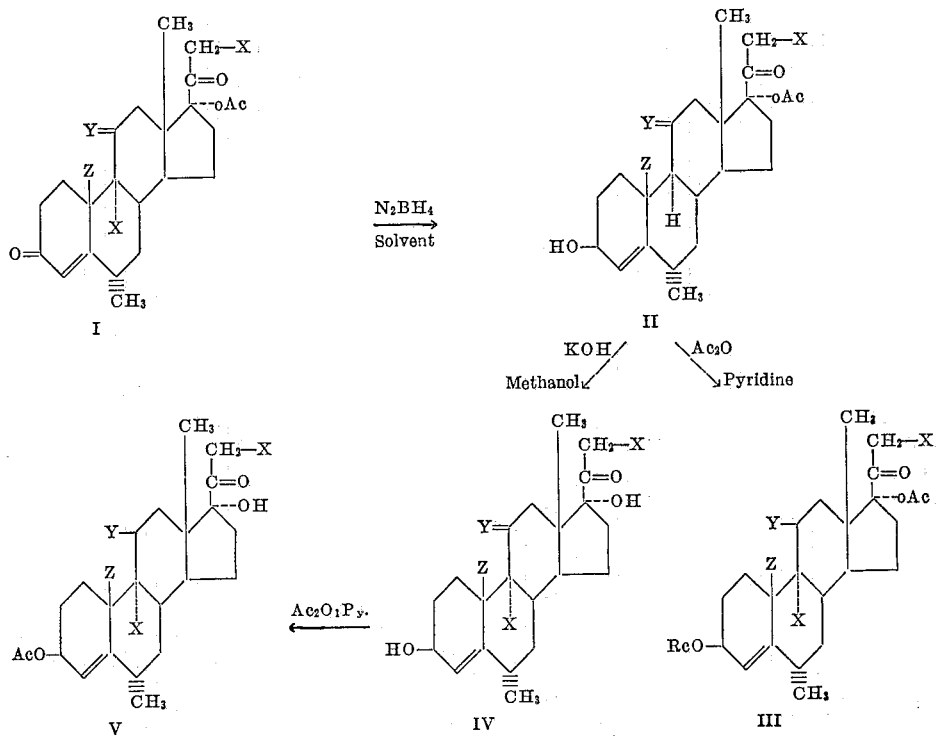

wherein X, Y and Z have the significance as identified above and Ac is acyl preferably acetyl.

The following examples illustrate the practice of this invention:

*Example I*

To 20 parts of 17-alpha-acetoxy-6-alpha-methylprogesterone were added 1000 parts of dry peroxide free tetrahydrofuran and 2 parts of finely ground sodium borohydride. The mixture was left stirring at room temperature for a period of 15 minutes, and then 10 parts of water were added. The stirring at room temperature was maintained for 3 days. At that time a flocculent white precipitate had separated—part of it in suspension and part of it adhering to the sides of the flask as a slime. This precipitate was found to consist of the inorganic oxidation and hydrolysis products of the sodium borohydride, and was efficiently removed by filtration. The perfectly clear filtrate was evaporated at reduced pressure, and at a bath temperature of 25° C. To the residue was added 50 parts ether and a heavy crystalline precipitate formed by standing over night. This material was filtered, washed with ether and dried. 7.1 parts obtained as a first crop harvest. The mother liquors were allowed to stand, during slow evaporation an addition crop of 5.8 parts was obtained. These crops constituted a yield of 64.5% of 3-beta-hydroxy-17-alpha-acetoxy-6-alpha-methylpregn - 4-en-20-one. The analytical sample was obtained by Soxhlet extraction of the combined crudes with ether and this material showed a melting point of about 178–181° C., and a specific optical rotation of about +22° when measured in chloroform solution at +22° about 1 g./100 ml. concentration. The infrared spectrum in potassium bromide suspension showed the salient $\lambda_{max.}$ seratim: $2.85\mu$ (OH), $5.80\mu$ (C=O, acetate), $5.91\mu$ (C=O), $6.09\mu$ (C=C), $8.00\mu$ (acetate band).

Proceeding according to this example but substituting for the 17-alpha-acetoxy-6-alpha-methyl progesterone as starting material, 17-alpha-acetoxy-11-oxo-21-chloro-6-alpha-methyl progesterone, or
17-alpha-acetoxy-11-hydroxy-9-chloro-6-alpha-methyl-progesterone or
17-alpha-acetoxy-9-fluoro-6-alpha-methyl progesterone or
17-alpha-acetoxy-11-oxo-21-fluoro-6-alpha-methyl progesterone or
17-alpha-acetoxy-19-nor-6-alpha-methyl progesterone or
17-alpha-acetoxy-11-oxo-9,21-dichloro-6-alpha-methyl progesterone, there was respectively obtained
3-beta-hydroxy-17-alpha-acetoxy-11-oxo-21-chloro-6-alpha-methyl-pregn-4-en-20-one,
3-beta-hydroxy-17-alpha-acetoxy-11-hydroxy-9-chloro-6-alpha-methyl-pregn-4-en-20-one,
3-beta-hydroxy-17-alpha-acetoxy-9-fluoro-6-alphamethyl-pregn-4-en-20-one,
3-beta-hydroxy-17-alpha-acetoxy-11-oxo-21-fluoro-6-alpha-methyl-pregn-4-en-20-one,
3-beta-hydroxy-17-alpha-acetoxy-19-nor-6-alpha-methyl-pregn-4-en-20-one and
3-beta-hydroxy-17-alpha-acetoxy-11-oxo-9,21-dichloro-6-alpha-methyl-pregn-4-en-20-one.

*Example II*

The mother liquors from Example I were combined and concentrated to dryness under reduced pressure. To the residue was added a little dry pyridine, and the concentration to dryness repeated. This efficiently removed the residual solvents. To this residue were added 14 parts of dry pyridine and 6.5 parts of acetic anhydride, and the mixture was left standing at room temperature for 36 hours. 1.5 parts of water were added to destroy excess acetic anhydride, and after the time elapse of about one hour a total of 100 parts of water and 50 parts of ice was added. The oil which separated soon solidified to an oily crystalline mass, which was separated. Trituration with a little methanol gave a crystalline slurry. The crystals were filtered and washed with a little methanol. 2.6 parts of 3-beta-17-alpha-diacetoxy-6-alpha - methylpregn-4-en-20-one were obtained, adding favorably to the yield of the selective reduction described in Example I. The analytical sample was prepared by recrystallization from aqueous methanol. The melting point of this purified material was about 153.5 to 155.5° C., and the specific optical rotation was about −8°, measured in chloroform solution, the (−8°) most characteristic bands in infrared were (measured in potassium bromide suspension): 5.75 (C=O, actate), 5.87 (C=O). 6.08 (C=C), 8.02 (acetate), microns.

Following the procedure of this example but substituting for the
3-beta-hydroxy-17-alpha-acetoxy-6-alpha-methyl-pregn-4-en-20-one as starting material,
3-beta-hydroxy-17-alpha-acetoxy-11-oxo-21-chloro-6-alpha-methyl-pregn-4-en-20-one or
3-beta-hydroxy-17-alpha-acetoxy-11-hydroxy-9-chloro-6-alpha-methyl-pregn-4-en-20-one or
3-beta-hydroxy-17-alpha-acetoxy-9-fluoro-6-alpha-methyl-pregn-4-en-20-one,
3-beta-hydroxy-17-alpha-acetoxy-11-oxo-21-fluoro-6-alpha-methyl-pregn-4-en-20-one or
3-beta-hydroxy-17-alpha-acetoxy-19-nor-6-alpha-methyl-pregn-4-en-20-one or
3-beta-hydroxy-17-alpha-acetoxy-11-oxo-9,21-dichloro-6-alpha-methyl-pregn-4-en-20-one, there was respectively obtained
3-beta-hydroxy-17-alpha-acetoxy-9-fluoro-6-alpha-methyl-pregn-4-en-20-one,
3-beta-17-alpha-di-acetoxy-11-hydroxy-9-chloro-6-alpha-methyl-pregn-4-en-20-one,
3-beta-17-alpha-di-acetoxy-9-fluoro-6-alpha-methyl-pregn-4-en-20-one,
3-beta-17-alpha-di-acetoxy-11-oxo-21-fluoro-6-alpha-methyl-pregn-4-en-20-one,
3-beta-17-alpha-di-acetoxy-19-nor-6-alpha-methyl-pregn-4-en-20-one and
3-beta-17-alpha-di-acetoxy-11-oxo-9,21-dichloro-6-alpha-methyl-pregn-4-en-20-one.

*Example III*

A mixture of 0.3 part of 3-beta-hydroxy-17-alpha-acetoxy-6-alpha-methylpregn-4-en-20-one (Example I), 1.0 part of pyridine and 0.5 part of acetic anhydride was left for 36 hours at room temperature. A few drops of water (0.1 part) was added and room temperature conditions maintained for a period of 1 hour. More water (3 parts) was then added, and the mixture left in the refrigerator for a couple of hours to complete the crystallization. The crystals were filtered, washed with water and dried. 0.322 part were obtained corresponding to 97% of theory, M.P. about 151 to 152° C. Recrystallization from ether-pentane provided the analytical sample of the 3-beta-17-alpha-diacetoxy-6-alpha-methylpregn-4-en-20-one in all respects identical with the substance obtained in Example II.

*Example IV*

In the case that the 3-beta-17-alpha-diacetoxy-6-alpha-methylpregn-4-en-20-one is the desired product and not the 17-monoacetate, the tetrahydrofuran residue from Example I, can be distilled with pyridine to remove residual solvent and then acetylated directly according to the procedure of Example II, thus obviating the isolation of the 17-monoacetate in a crystalline form. 3-beta-17-alpha-diacetoxy - 6 - alpha-methylpregn-4-en-20-one is obtained, with savings in time and overall performance yieldwise, as the 3,17-diacetate is easier to obtain in a crystalline form than the 17-monoacetate.

Similar compounds can be formed following the same procedure as set forth in Example 3 or 4.

*Example V*

To a refluxing solution of 0.5 part of 3-beta-hydroxy-17-alpha-acetoxy - 6 - alpha-methylpregn-4-en-20-one in methanol (10 parts), was added slowly during 30 minutes 1.3 parts of a N/1 aqueous sodium hydroxide solution. The mixture was refluxed for a period of 60 minutes subsequent to the completion of the addition. Distilled water (7 parts) was added and the crystallization was initiated by slow cooling, and completed overnight in the refrigerator. The crystals were filtered and washed well with water. Yield—0.4715 part of 3-beta-17-alpha-dihydroxy-6-alpha-methyl-pregn-4-en-20-one, melting at about 200 to 203° C. Recrystallization from methanol provided the analytical sample exhibiting a melting point of about 201 to 203° C., and an optical rotation of about 32° measured in chloroform solution. The most characteristic bands in infrared were: (KBr suspension): 2.9 (—OH), 5.92 (C=O), 6.07 (C=C), microns.

Proceeding according to this example but substituting for the 3-beta-hydroxy-17-alpha-acetoxy-6-alpha-methyl-pregn-4-en-20-one as starting material, 3-beta-hydroxy-17-alpha-acetoxy - 11 - oxo - 21 - chloro-6-alpha-methyl-pregn-4-en-20-one, or 3-beta-hydroxy-17-alpha-acetoxy-11-hydroxy-9-chloro-6-alpha-methyl-pregn-4-en-20-one or 3-beta-hydroxy-17-alpha - acetoxy-9-fluoro-6-alpha-methyl-pregn-4-en-20-one or 3-beta-hydroxy-17-alpha-acetoxy-11-oxo-21-fluoro-6-alpha - methyl - pregn-4-en-20-one, or 3-beta-hydroxy-17-alpha - acetoxy-19-nor-6-alpha-methyl-pregn-4-en-20-one or 3-beta-hydroxy - 17 - alpha-acetoxy-11-oxo-9,20-dichloro-6-alpha - methyl - pregn-4-en-20-one there was respectively obtained 3 - beta - 17 - alpha-dihydroxy-11-oxo-21-chloro-6-alpha - methyl-pregn-4-en-one, 3-beta-17-alpha - dihydroxy-11-hydroxy-9-chloro-6-alpha-methyl-pregn-4-en-20-one, 3-beta-17-alpha - dihydroxy-9-fluoro-6-alpha-methyl-pregn-4-en-20-one, 3-beta-17-alpha-dihydroxy-11-oxo-21-fluoro-6-alpha - methyl - pregn-4-en-20-one, 3-beta-17-alpha-dihydroxy-19-nor-6-alpha-methyl-pregn-4-en-20-one and 3-beta-17-alpha-dihydroxy-11-oxo-9,21-dichloro-6-alpha-methyl-pregn-4-en-20-one.

*Example VI*

A mixture of 3-beta-17-alpha-dihydroxy-6-alpha-methylpregn-4-en-20-one (0.2 part), pyridine (0.7 part, dry), and acetic anhydride (0.35 part) was left for 36 hours at room temperature. 0.1 part of water was added and room temperature conditions maintained for a period of one hour by which time the excess anhydride was assumed hydrolyzed. More water was added, and the monoacetate was separated as an oil, which solidified and was recrystalized twice from aqueous methanol. This sample of 17-alpha-hydroxy-3-beta-acetoxy - 6 - alpha-methyl-pregn-4-en-20-one melted at about 232 to 235°. The characteristic infrared bands obtained in KBr suspension were: 2.80 (OH), 5.80, 5.85 (C=O, acetate and C=O superimposed), 6.02 (inflection, C=C), 7.9–8.00 (acetate). $\alpha_D^{22°}$ was about +7.50.

Proceeding according to this example but substituting for the 3-beta-17-alpha-dihydroxy-6-alpha-methyl-pregn-4 - en - 20 - one as starting material, 3-beta,17-alpha-dihydroxy-11-oxo-21-chloro-6-alpha - methyl - pregn-4-en-20-one or 3-beta,17-alpha - 11 - beta-trihydroxy-9-chloro-6-alpha-methyl - pregn-4-en-20-one or 3-beta,17-alpha-dihydroxy-9-fluoro-6-alpha - methyl - pregn-4-en-20-one or 3-beta,17-alpha - dihydroxy-11-oxo-21-fluoro-6-alpha-methyl-pregn-4-en-20-one there was respectively obtained 3-beta-acetoxy - 17 - alpha-hydroxy - 11 - oxo-21-chloro-6-alpha-methyl-pregn-4-en-20-one, 3-beta-acetoxy-17-alpha-hydroxy-11-hydroxy-9-chloro - 6 - alpha-methyl-pregn-4-en-20-one, 3-beta - acetoxy-17-alpha-hydroxy-9-fluoro-6-alpha-methyl-pregn-4-en-20-one, 3-beta-acetoxy-17-alpha-hydroxy-11-oxo-21-fluoro - 6 - alpha - methyl-pregn-4-en-20-one, 3-beta - acetoxy-17-alpha-hydroxy-19-nor-6-alpha-methyl-pregn-4-en-20-one, and 3-beta - acetoxy-17-alpha-hydroxy - 11 - oxo-9,21-dichloro-6-alpha-methyl-pregn-4-en-20-one.

*Example VII*

To 17-alpha-acetoxy-6-alpha-methyl progesterone (11.5 g.) was added 1000 cc. of 2-methyl-2-ethyl-1,3-dioxolane and sodium borohydride (780 mg.). The mixture was left stirring at room temperature for 2 hours and 10 cc. of water was added and the stirring continued for 65 hours, forming a white precipitate of inorganic residues. The product was filtered through a coarse filter and concentrated almost to dryness under reduced pressure. 50 cc. of ether was added and the steroid was filtered, washed well with water and the granular precipitate left standing overnight in the laboratory. The product was filtered, washed with ether and dried. 9.8 grams of the product obtained was the same as in Example I.

Proceeding according to this example but substituting for the 17-alpha-acetoxy-6-alpha-methyl progesterone as starting material, 17-alpha-acetoxy - 21 - chloro-6-alpha-methyl-progesterone or 17 - alpha - propionoxy-11-oxo-6-alpha-methyl-progesterone, or 17 - alpha - acetoxy-11-hydroxy-6-alpha-methyl-progesterone or 17-alpha-acetoxy-11-oxo-9-fluoro-6-alpha-methyl-progesterone or 17-alpha-acetoxy-11-oxo-9,21-dichloro-6-alpha - methyl-progesterone or 17-alpha-acetoxy-11-oxo - 19 - nor-6-alpha-methyl-progesterone or 17-alpha-acetoxy-11-oxo-9,21-difluoro-6-alpha-methyl-progesterone or 17-alpha-acetoxy-19-nor-6-alpha - methyl - progesterone there was respectively obtained 3-beta - hydroxy - 17 - alpha-acetoxy-21-chloro-6-alpha - methyl - pregn - 4-en-20-one, 3-beta-hydroxy-17-alpha-propionoxy-11-oxo-6-alpha - methyl-pregn-4-en-20-one, 3-beta-hydroxy - 17 - alpha - acetoxy-11-hydroxy-6-alpha - methyl - pregn - 4-en-20-one, 3-beta-hydroxy-17-alpha-acetoxy - 11 - oxo-9-fluoro-6-alpha-methyl-pregn-4-en-20-one, 3-beta-hydroxy-17-alpha-acetoxy-11-oxo-9,21-dichloro - 6 - alpha-methyl-pregn-4-en-20-one, 3-beta-hydroxy-17-alpha - acetoxy - 11 - oxo-19-nor-6-alphamethyl-pregn-4-en-20-one, 3-beta - hydroxy-17-alpha-acetoxy-11-oxo-9,21-difluoro-6-alpha - methyl-pregn-4-en-20-one and 3-beta-hydroxy-17-alpha - acetoxy-19-nor-6-alpha-methyl-pregn-4-en-20-one.

*Example VIII*

Proceeding according to Example III but substituting for the acetic anhydride, propionic anhydride, butyric anhydride, dimethyl valeric anhydride, caproic anhydride, heptanoic anyhdride, oxtanoic anhydride, cyclopentanoic anhydride, cyclohexanoic anhydride, phenylacetic anhydride there was respectively obtained 3-beta-propionoxy-17-acetoxy-6-alpha-methyl-pregn-4-en-20-one,
3-beta-butyroxy-17-acetoxy-6-alpha-methyl-pregn-4-en-20-one,
3-beta-dimethyl-valeroxy-17-acetoxy-6-alpha-methyl-pregn-4-en-20-one,
3-beta-caproyloxy-17-acetoxy-6-alpha-methyl-pregn-4-en-20-one,
3-beta-heptanoyloxy17-acetoxy-6-alpha-methyl-pregn-4-en-20-one,
3-beta-octanoyloxy-17-acetoxy-6-alpha-methyl-pregn-4-en-20-one,
3-beta-cyclopentanoyloxy-17-acetoxy-6-alpha-methyl-pregn-4-en-20-one,
3-beta-cyclo-hexanoyloxy-17-acetoxy-6-alpha-methyl-pregn-4-en-20-one and
3-beta-phenylacetoxy-17-acetoxy-6-alpha-methyl-pregn-4-en-20-one.

Proceeding according to Example III but substituting for the 3-beta-hydroxy-17-alpha-acetoxy-6-alpha-methyl-pregn-4-en-20-one as starting material, 3-beta-hydroxy-17-alpha-acetoxy-21-chloro-6-alpha-methyl-pregn-4-en-20-one or
3-beta-hydroxy-17-alpha-propionoxy-11-oxo-6-alpha-methyl-pregn-4-en-20-one or
3-beta-hydroxy-17-alpha-acetoxy-11-oxo-hydroxy-6-alpha-methyl-pregn-4-en-20-one or
3-beta-hydroxy-17-alpha-acetoxy-11-oxo-9-fluoro-6-alpha-methyl-pregn-4-en-20-one or
3-beta-hydroxy-17-alpha-acetoxy-11-oxo-9,21-dichloro-6-alpha-methyl-pregn-4-en-20-one or
3-beta-hydroxy-17-alpha-acetoxy-11-oxo-19-nor-6-alpha-methyl-pregn-4-en-20-one or
3-beta-hydroxy-17-alpha-acetoxy-11-oxo-9,21-difluoro-6-alpha-methyl-pregn-4-en-20-one or
3-beta-hydroxy-17-alpha-acetoxy-19-nor-6-alpha-methyl-pregn-4-en-20-one, there was respectively obtained 3-beta-17-alpha-diacetoxy-21-chloro-6-alpha-methyl-pregn-4-en-20-one,
3-beta-acetoxy-17-alpha-propionoxy-11-oxo-6-alpha-methyl-pregn-4-en-20-one,
3-beta-17-alpha-diacetoxy-11-beta-hydroxy-6-alpha-methyl-pregn-4-en-20-one,
3-beta-17-alpha-diacetoxy-11-oxo-9-fluoro-6-alpha-methyl-pregn-4-en-20-one,
3-beta-17-alpha-diacetoxy-11-oxo-9,21-dichloro-6-alpha-methyl-pregn-4-en-20-one,
3-beta-17-alpha-diacetoxy-11-oxo-19-nor-6-alpha-methyl-pregn-4-en-20-one,
3-beta-17-alpha-diacetoxy-11-oxo-9,21-difluoro-6-alpha-methyl-pregn-4-en-20-one and
3-beta-17-alpha-diacetoxy-19-nor-6-alpha-methyl-pregn-4-en-20-one.

*Example IX*

Proceeding according to Example V but substituting for the 3-beta-hydroxy-17-alpha-acetoxy - 6 - alpha - methyl-pregn-4-en-20-one as starting material 3-beta-hydroxy-17-alpha-acetoxy-21-chloro-6-alpha-methyl-pregn-4-en-20-one or
3-beta-hydroxy-17-alpha-propionoxy-11-oxo-6-alpha-methyl-pregn-4-en-20-one or
3-beta-hydroxy-17-alpha-acetoxy-11-oxo-6-alpha-methyl-pregn-4-en-20-one or
3-beta-hydroxy-17-alpha-acetoxy-11-hydroxy-9-fluoro-6-alpha-methyl-pregn-4-en-20-one or
3-beta-hydroxy-17-alpha-acetoxy-11-beta-hydroxy-9,21-dichloro-6-alpha-methyl-pregn-4-en-20-one or
3-beta-hydroxy-17-alpha-acetoxy-11-oxo-19-nor-6-alpha-methyl-pregn-4-en-20-one or
3-beta-hydroxy-17-alpha-acetoxy-11-oxo-9,21-difluoro-6-alpha-methyl-pregn-4-en-20-one or
3-beta-hydroxy-17-alpha-acetoxy-9-chloro-19-nor-6-alpha-methyl-pregn-4-en-20-one there was respectively obtained 3-beta-17-alpha-dihydroxy-21-chloro-6-alpha-methyl-pregn-4-en-20-one,
3-beta-17-alpha-dihydroxy-11-oxo-6-alpha-methyl-pregn-4-en-20-one,
3-beta-17-alpha-dihydroxy-11-oxo-6-alpha-methyl-pregn-4-en-20-one,
3-beta-17-alpha-11-beta-trihydroxy-9-fluoro-6-alpha-methyl-pregn-4-en-20-one,
3-beta-17-alpha-11-beta-trihydroxy-9,21-dichloro-6-alpha-methyl-pregn-4-d-en-20-one,
3-beta-17-alpha-dihydroxy-11-oxo-19-nor-6-alpha-methyl-pregn-4-en-20-one,
3-beta-17-alpha-dihydroxy-11-oxo-9,21-difluoro-6-alpha-methyl-pregn-4-en-20-one and
3-beta-17-alpha-dihydroxy-9-chloro-19-nor-6-alpha-methyl-pregn-4-en-20-one.

*Example X*

Proceeding according to Example VI but substituting for the 3-beta-17-alpha-dihydroxy-6-alpha-methyl-pregn-4-en-20-one as starting material, 3-beta-17-alpha-dihydroxy-21-chloro-6-alpha-methyl-pregn-4-en-20-one or
3-beta-17-alpha-dihydroxy-11-oxo-9-chloro-6-alpha-methyl-pregn-4-en-20-one or
3-beta-17-alpha-11-beta-trihydroxy-6-alpha-methyl-pregn-4-en-20-one or 3-beta-17-alpha-dihydroxy-11-oxo-9-fluoro-6-alpha-methyl-pregn-4-en-20-one or
3-beta-17-alpha-11-beta-trihydroxy-9,21-dichloro-6-alpha-methyl-pregn-4-en-20-one or
3-beta-17-alpha-dihydroxy-11-oxo-19-nor-6-alpha-methyl-pregn-4-en-20-one or
3-beta-17-alpha-dihydroxy-11-oxo-9,21-difluoro-6-alpha-methyl-pregn-4-en-20-one or
3-beta-17-alpha-dihydroxy-21-chloro-19-nor-6-alpha-methyl-pregn-4-en-20-one there was respectively obtained 3-beta-acetoxy-17-alpha-hydroxy-11-oxo-21-chloro-6-alpha-methyl-pregn-4-en-20-one,
3-beta-acetoxy-17-alpha-hydroxy-11-oxo-9-chloro-6-alpha-methyl-pregn-4-en-one,
3-beta-acetoxy-11-beta-17-alpha-dihydroxy-6-alpha-methyl-pregn-4-en-20-one,
3-beta-acetoxy-17-alpha-hydroxy-11-oxo-9-fluoro-6-alpha-methyl-pregn-4-en-20-one,
3-beta-acetoxy-17-alpha-11-beta-dihydroxy-9,21-dichloro-6-alpha-methyl-pregn-4-en-20-one,
3-beta-acetoxy-17-alpha-hydroxy-11-oxo-19-nor-6-alpha-methyl-pregn-4-en-20-one,
3-beta-acetoxy-17-alpha-hydroxy-11-oxo-9,21-difluoro-6-alpha-methyl-pregn-4-en-20-one and
3-beta-acetoxy-17-alpha-hydroxy-21-chloro-19-nor-6-alpha-methyl-pregn-4-en-20-one.

The effectiveness of applicants' compounds is illustrated by the following tests:

I. ORAL PROGESTATIONAL ASSAY OF McPHAIL (McPhail, M. K., J. Physiol. 83: 145, 1934)

Immature female rabbits, weighing 750–950 gm. were primed with estradiol benzoate subcutaneously over a six day period. After this priming period, the test compound was administered orally once daily for five days. The uterine proliferation was graded on a scale from zero (no stimulation) to 4+ (maximum progestational effect).

TABLE I.—THE ORAL PROGESTATIONAL ACTIVITY OF 6α-METHYL-3β,17α-DIACETOXYPREGN-4-EN-20-ONE IN THE RABBIT

| Compound | Total Dose, mg. | No. of Rabbits | Response [1] (Range) |
|---|---|---|---|
| 17α-ethynyl-19-nortestosterone (Standard).[2] | 0.63 | 9 | 1.3 (0.5–2.0) |
|  | 1.25 | 14 | 2.9 (1.5–4.0) |
|  | 2.5 | 3 | 3.5 (3.0–4.0) |
|  | 5.0 | 5 | 3.8 (3.5–4.0) |
| 6α-methyl-3β,17α-diacetoxypregn-4-en-20-one. | 0.02 | 3 | 0 |
|  | 0.04 | 3 | 0.3 (0–1) |
|  | 0.08 | 3 | 2 (0.5–3.0) |
|  | 0.15 | 4 | 3.3 (3.0–3.5) |
|  | 0.3 | 2 | 3.5 (3.5–3.5) |
|  | 0.6 | 2 | 4 |
|  | 1.2 | 2 | 4 |

[1] Response scale from 0 to 4+.
[2] Data published by F.A. Kincl, Endokrinologie 40, 257–266, 1961.

II. ANTI-ESTROGEN METHOD (Dorfman, R. I. and Kincl, F. A., Steroids 1: 185, 1963)

Twenty to twenty-two day old Swiss albino mice were injected subcutaneously once daily with estrone for three days. The total dose of 0.4 μg was contained in 0.3 ml. of sesame oil and 0.1 ml. was injected daily. Control groups of mice received only sesame oil. The test substance was injected subcutaneously or administered by gavage once daily for 3 days in 0.2 ml. per day of an aqueous suspending vehicle at a site different from that used for estrone injections. Separate sites were used for the injection of the estrogen and the test compound to prevent the possibility that a lowered estrogenic effect might be due to a decreased rate of estrogen absorption from the injection site. The aqueous suspending medium consisted of sodium chloride (0.9%), polysorbate 80 (0.4%), carboxymethylcellulose (0.5%), and benzyl alcohol (0.9%). One day after the last injection, the animals were sacrificed and uterine weights and body weights determined.

TABLE II.—THE ANTI-ESTROGENIC ACTIVITY OF 6α-METHYL-3α,17β-DIACETOXYPREGN-4-EN-20-ONE IN A MOUSE TEST BY GAVAGE

| Route | Steroid | Total No. of Mice | Dose Range Studied, μg. | Minimum Dose to Produce Inhibition, μg. |
|---|---|---|---|---|
| Gavage | 6α-methyl-17α-acetoxy-pregn-4-ene-3,20-dione. | 55 | 50–1,000 | 500 |
|  | 6α-methyl-3β,17α-diacetoxy-pregn-4-en-20-one. | 20 | 50–150 | 150 |

III. ANTI-ANDROGEN METHOD (Dorfman, R. I., Proc. Soc. Exptl. Biol. and Med., 111: 44, 1962; Steroids 2: 185, 1963)

Swiss albino mice were castrated at 21 to 23 days of age. On the day of operation and once daily for a total of seven consecutive days, testosterone or methyltestosterone (17α-methyl-17β-hydroxy-androst-4-en-3-one) dissolved in 0.1 ml. of sesame oil was injected subcutaneously. The total dose of androgen was 0.8 mg. The test material in an aqueous suspending medium was injected once daily for 7 days, also, starting on the day of operation. This medium consists of sodium chloride (0.9%), polysorbate 80 (0.4%), carboxy-methyl cellulose (0.5%) and benzyl alcohol (0.9%). Twenty-four hours after the last injections the body, prostate, and seminal vesicle weights were determined. The results were expressed as tissue ratios defined as milligrams of tissue per gram of body weight.

TABLE III.—THE MOUSE ANTI-ANDROGENIC ACTIVITY OF 6α - METHYL - 3β,17α - DIHYDROXYPREGN-4-EN-20-ONE-17-ACETATE (I) COMPARED TO 6α-METHYL-17α-HYDROXYPREGN-4-ENE-3,20-DIONE-17-ACETATE (II)

| Test Compound Designation | Total Dose, mg. | Total Dose of Testosterone mg. | No. of Mice | Seminal Vesicles Ratio±S.E. |
|---|---|---|---|---|
| 0 | 0 | 0 | 9 | 0.15±0.02 |
| 0 | 0 | 0.8 | 9 | 0.86±0.04 |
| II | 5 | 0.8 | 9 | 0.94±0.05 |
|  | 15 | 0.8 | 8 | 0.86±0.06 |
| I | 5 | 0.8 | 4 | 1.08±0.19 |
|  | 15 | 0.8 | 7 | 0.65±0.09 |

Table III illustrates the increase in antiandrogenic activity for the delta-4-3β-ol steroid (Compound I) as compared to the corresponding delta-4-3-ketone (Compound I). No signficant antiandrogenic effect could be elicited from 5 and 15 mg. total doses of II, but the 15 mg. dose of I showed a significant lowering of the seminal vesicle ratio from 0.86±0.04 (S.E.) to 0.65±0.09.

TABLE IV.—THE MOUSE ANTIANDROGENIC ACTIVITY OF 6α-METHYL DIHYDROXYPREGN-4-EN-20-ONE-3β,17α-DIACETATE (I) COMPARED TO 6α-METHYL-17α-HYDROXYPREGN-4-ENE-3,20-DIONE-3β,17α-DIACETATE (II)

| Test Compound Designation | Total Dose, mg. | Total Dose of Testosterone mg. | No. of Mice | Seminal Vesicles Ratio±S.E. |
|---|---|---|---|---|
| 0 | 0 | 0 | 9 | 015±0.02 |
| 0 | 0 | 0.8 | 9 | 0.86±0.04 |
| II | 5 | 0.8 | 9 | 0.94±0.05 |
|  | 15 | 0.8 | 8 | 0.86±0.06 |
| I | 5 | 0.8 | 8 | 0.81±0.13 |
|  | 15 | 0.8 | 9 | 0.66±0.07 |

Table IV illustrates the increase in antiandrogenic activity for the delta-4-3β-ol steroid (Compound II) as compared to the corresponding delta-4-3-ketone (Compound I). No significant antiandrogenic effect could be elicited from 5 and 15 mg. total doses of II, but the 15 mg. dose of I showed a significant lowering of the seminal vesicle ratio from 0.86±0.04 (S.E.) to 0.66±0.07.

It has been found possible to reduce 6-alpha-methyl-17-acyloxy progesterone compounds with alkali metal borohydride in the presence of tertiary butanol to which water can be added, and in which digitonide separation of the 3-beta-hydroxy reduction product is not necessary. However, it is found that considerably more active reduction results which tends to slightly reduce some of the 20-keto compounds resulting in undesirable impurity. Operating in this manner, the ultimate reduced compound can be produced with chromatographic purification and a procedure which is somewhat more expensive because of the extra step of purification than is available using ether as a solvent according to the earlier examples herein. However, with that drawback, tertiary butanol can be used as a solvent although the procedure is not preferred according to the following example:

*Example XI.—3β-hydroxy-17α-acetoxy-6α-methyl-pregn-4-en-20-one*

To 17-alpha-acetoxy - 6 - alpha - methylprogesterone (11.5 g.) was added tertiary butanol (2 l.) and sodium borohydride (780 mg.). The mixture was left stirring at room temperature for 62 hours filtered through a coarse filter and concentrated almost to dryness under reduced pressure. 500 ml. of distilled water and ice was added and the mixture stirred for 2 hours. The steroid was filtered, washed well with water and the granular precipitate left for 8 days in the laboratory. This material was taken up in 200 ml. benzene, some insoluble decanted off (700 mg., 20-hydroxy derivative) and chromatographed on 600 g. silica gel. Elution with benzene chloroform of increasing chloroform content, pure chloroform and finally with chloroform containing 1% methanol, provided fractions, which after evaporation and crystallization from ether/hexane gave a total of 2.073 g. of 3-beta-hydroxy-17-alpha-acetoxy - 6 - alpha-methylpregn - 4 - en-20-one: M.P. 178–181°; $a_D$+25°.KBr$_{max}$.2.85(OH), 5.80 (C=O, acetate), 5.91 (C=O), 6.10 (C=C), 8.00 (acetate). $C_{24}H_{36}O_4$, calcd.: C, 74.19; H, 9.34. Found: C, 74.39; H, 9.56.

From the more polar fractions (40, 50 and 100% chloroform) a total of 5.57 g. of material was obtained which according to the infrared spectrum appeared to be essentially starting material containing the allylic alcohol. This material can be recycled.

Our compounds for the purposes intended may be used by admixing with various therapeutically acceptable carriers and excipient substances; for instance, fixed oil such as peanut oil, olive oil or the like or inert insoluble soaps such as aluminum stearate and implantation or injection as a depot type composition, or the product in the pure state or mixed with excipient such as starch, bentonite or the like may be compressed into tablets sized to a suitable dosage level or fraction or multiple thereof as indicated by the above tests.

We claim:

1. The method of reducing a 3-oxo radical of a 3-oxo-6 - alpha-methyl-pregn - 4 - en - 20 - one compound selectively to avoid reduction of other reducible radicals in the molecule comprising dissolving the compound in a non-polar solvent medium comprising a lower hydrocarbon ether and a small quantity of water and then adding to said solution sufficient alkali metal borohydride to reduce the 3-oxo group.

2. The method of producing a compound having the formula

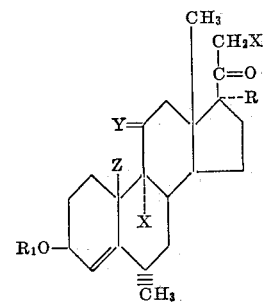

wherein R is a member of the group consisting of hydroxy and acyloxy, $R_1$ is a member of the group consisting of hydrogen and acyl, the acyl group of both R and $R_1$ being a carboxylic acid acyl having from 1 to 10 carbon atoms, X is a member of the group consisting of hydrogen chlorine and fluorine, Y is a member of the group consisting of =O, beta hydroxy and $H_2$, and Z is a member of the group consisting of hydrogen and methyl, comprising selectively reducing a compound having the formula

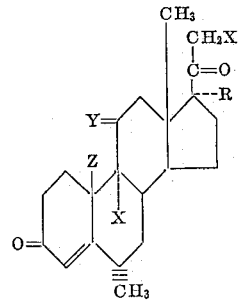

wherein R, X, Y and Z have the same significance as defined above, by dissolving the compound to be reduced in a liquid medium a lower hydrocarbon ether and a small quantity of water, and adding to said solution only sufficient alkali metal borohydride to reduce the 3-keto group, and where $R_1$ is acyl, further acylating the reduction product with a carboxylic acid acyl group having from 1 to 10 carbon atoms.

3. The method of forming a compound having the formula

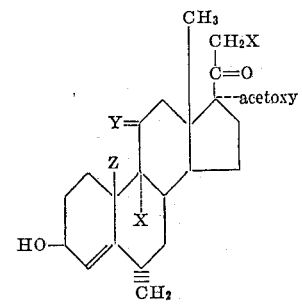

wherein X is a member of the group consisting of hydrogen, chlorine and fluorine, Y is a member of the group consisting of =O, beta hydroxy and $H_2$, and Z is a member of the group consisting of hydrogen and methyl, comprising selectively reducing a compound having the formula

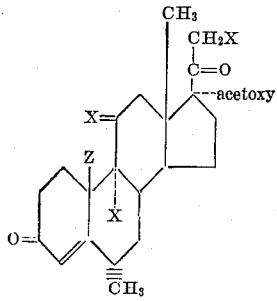

wherein X, Y and Z have the significance given above, by dissolving the compound to be reduced in liquid medium comprising a saturated lower hydrocarbon ether and a small quantity of water, and adding an alkali metal borohydride to the solution in quantity only about sufficient to reduce the 3-oxo group.

4. The method of forming a compound having the formula

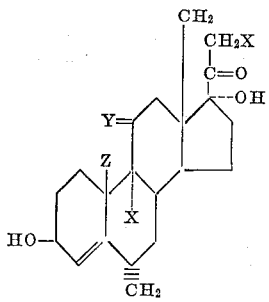

wherein X is a member of the group consisting of hydrogen, chlorine and fluorine, Y is a member of the group consisting of =O, beta hydroxy and $H_2$, and Z is a member of the group consisting of hydrogen and methyl, comprising selectively reducing a compound having the formula

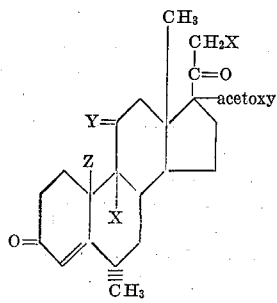

wherein X, Y and Z have the significance given above, by dissolving the compound to be reduced in liquid medium in a saturated lower hydrocarbon ether and a small quantity of water, adding an alkali metal borohydride to the solution in quantity only about sufficient to reduce the 3-oxo group and then hydrolyzing off the 17-acetyl group.

5. The method of forming a compound having the formula

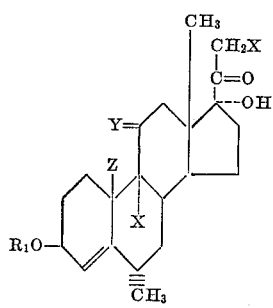

wherein $R_1$ is a member of the group consisting of hydrogen and acyl, the acyl group of $R_1$ being a carboxylic acid acyl having from 1 to 10 carbon atoms, X is a member of the group consisting of hydrogen chlorine and fluorine, Y is a member of the group consisting of =O, beta hydroxy and $H_2$, and Z is a member of the group consisting of hydrogen and methyl, comprising selectively reducing a compound having the formula

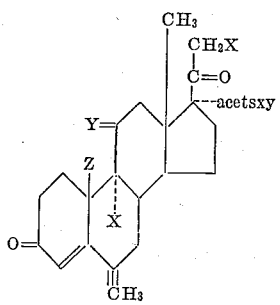

wherein X, Y and Z have the significance given above by dissolving the compound to be reduced in liquid medium comprising a saturated lower hydrocarbon ether and a small quantity of water, adding an alkali metal borohydride to the solution in quantity only about sufficient to reduce the 3-oxo group, hydrolyzing off the 17-acetyl group and then acylating the 3-hydroxy group with a carboxylic acyl having from 1 to 10 carbon atoms.

6. The method of forming a compound having the formula

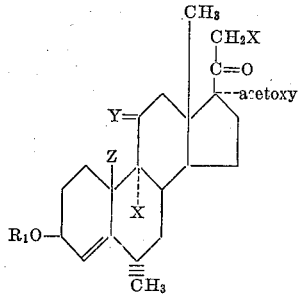

wherein $R_1$ is a member of the group consisting of hydrogen and acyl, the acyl group of $R_1$ being a carboxylic acid acyl having from 1 to 10 carbon atoms, X is a member of the group consisting of hydrogen, chlorine and fluorine, Y is a member of the group consisting of =O, beta hydroxy and $H_2$, and Z is a member of the group consisting of hydrogen and methyl, comprising selectively reducing a compound having the formula

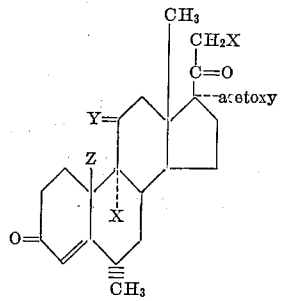

wherein X, Y and Z have the significance given above by dissolving the compound to be reduced in a liquid medium comprising a saturated lower hydrocarbon ether and a small quantity of water, adding an alkali metal borohydride to the solution in quantity only about sufficient to reduce the 3-oxo group, and then acylating with the 3-hydroxy group with a carboxylic acyl having 1 to 10 carbon atoms.

7. The method of forming a compound having the formula

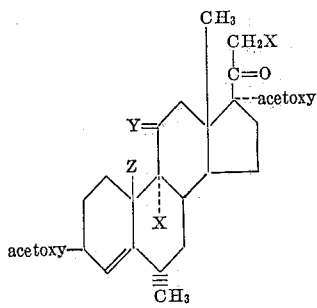

wherein X is a member of the group consisting of hydrogen, chlorine and fluorine, Y is a member of the group consisting of =O, beta hydroxy and $H_2$, and Z is a member of the group consisting of hydrogen and methyl, comprising selectively reducing a compound having the formula

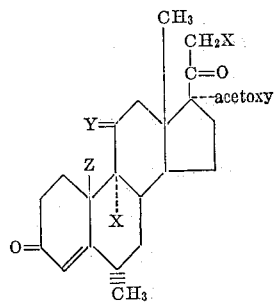

wherein X, Y and Z have the significance given above by dissolving the compound to be reduced in a liquid medium comprising a saturated lower hydrocarbon ether and a small quantity of water, adding an alkali metal borohydride to the solution in quantity only about sufficient to reduce the 3-oxo group, and then acetylating the 3-beta-hydroxy group.

8. The method of selectively reducing 6-alpha-methyl-17-alpha-acetoxy progesterone comprising dissolving the compound in a medium comprising a lower hydrocarbon ether and a small quantity of water, and adding alkali metal borohydride in quantity only about sufficient to reduce the 3-oxo group.

9. The method of forming 3-beta-17-alpha-dihydroxy-6-alpha-methyl-pregn-4-en-20-one comprising selectively reducing 6-alpha-methyl-17-alpha-acetoxy progesterone by dissolving the compound in a medium comprising a lower hydrocarbon ether and a small quantity of water and adding alkali metal borohydride in quantity only about sufficient to reduce the 3-oxo group, and then hydrolyzing the 17-acetyl group.

10. The method of forming 3-beta-acyloxy-17-acetoxy-6-alpha-methyl-pregn-4-en-20-one, the acyl group having 1 to 10 carbon atoms comprising selectively reducing 17-alpha-acetoxy-6-alpha-methyl-progesterone in medium comprising a lower hydrocarbon ether and a small quantity of water with an alkali metal borohydride in quantity only about sufficient to reduce the 3-oxo group, and then acylating the 3-beta-hydroxy group with carboxylic acyl having from 1 to 10 carbon atoms.

11. The method of forming 3-beta-acyloxy-17-alpha-hydroxy-6-alpha-methyl-pregn-4-en-20-one comprising selectively reducing 17-alpha-acetoxy-6-alpha-methyl-progesterone in a lower medium comprising hydrocarbon ether and a small quantity of water with an alkali metal borohydride in quantity only about sufficient to reduce the 3-oxo group, hydrolyzing the 17-acetyl to a 17-hydroxy group, and then acylating the 3-beta-hydroxy group with carboxylic acyl having from 1 to 10 carbon atoms.

12. The method of reducing a 3-oxo radical of a 3-oxo-6-alpha-methyl-17-alpha-acyloxy-pregn-4-en-20-one compound selectively to avoid reduction of other reducible radicals in the molecule comprising dissolving the compound in tertiary butanol and a small quantity of water and then adding to said solution sufficient alkali metal borohydride to reduce the 3-oxo group.

13. The method of selectively reducing 6-alpha-methyl-17-alpha-acetoxy progesterone comprising dissolving the compound in a medium comprising tertiary butanol and a small quantity of water, and adding alkali metal borohydride in quantity only about sufficient to reduce the 3-oxo group.

14. The method of forming 3-beta-17-alpha-dihydroxy-6-alpha-methyl-pregn-4-en-20-one comprising selectively reducing 6-alpha-methyl-17-alpha-acetoxy-progesterone by dissolving the compound in a medium comprising tertiary butanol and a small quantity of water and adding alkali metal borohydride in quantity only about sufficient to reduce the 3-oxo group, and then hydrolyzing the 17-acetyl group.

15. The method of forming 3-beta-acyloxy-17-acetoxy-6-alpha-methyl-pregn-4-en-20-one, the acyl group having 1 to 10 carbon atoms comprising selectively reducing 17-alpha-acetoxy-6-alpha-methyl-progesterone in medium comprising tertiary butanol and a small quantity of water with an alkali metal borohydride in quantity only about sufficient to reduce the 3-oxo group, and then acylating the 3-beta-hydroxy group with carboxylic acyl having from 1 to 10 carbon atoms.

16. The method of forming 3-beta-acyloxy-17-alpha-hydroxy-6-alpha-methyl-pregn-4-en-20-one comprising selectively reducing 17-alpha-acetoxy-6-alpha-methyl-progesterone in tertiary butanol and a small quantity of water with an alkali metal borohydride in quantity only about sufficient to reduce the 3-oxo group, hydrolyzing the 17-acetyl to a 17-hydroxy group, and then acylating the 3-beta-hydroxy group with carboxylic acyl having from 1 to 10 carbon atoms.

17. The method which comprises selectively reducing the 3-oxo group of a 3-oxo-6-alpha-methyl-17-alpha-acyloxy-pregn-4-en-20-one compound with an alkali metal borohydride in the presence of an organic solvent containing a small quantity of water.

References Cited

Chem. Ab., vol. 49, 75854 (1955).
Kupfer-Tetrahedron, vol. 15, pp. 193–96 (1961).

LEWIS GOTTS, *Primary Examiner.*

H. A. FRENCH, *Assistant Examiner.*